United States Patent [19]
Doniger et al.

[11] 3,740,004
[45] June 19, 1973

[54] VERTICAL FLIGHT PATH COMPUTER

[75] Inventors: Jerry Doniger, Montvale, N.J.; Carson Morse, Dayton; Siegfried Knemeyer, Yellow Springs, both of Ohio

[73] Assignee: The Bendix Corporation, Teterboro, N.J.

[22] Filed: Dec. 27, 1967

[21] Appl. No.: 693,970

[52] U.S. Cl........ 244/77 D, 244/77 A, 235/150.22, 318/583, 318/584
[51] Int. Cl. ............................................ B64c 19/00
[58] Field of Search............. 244/77 A, 77 B, 77 D; 235/150.22, 150.26; 318/583, 584

[56] References Cited
UNITED STATES PATENTS

| | | | |
|---|---|---|---|
| 3,077,557 | 2/1963 | Joline et al. ........................ | 244/77 B |
| 3,126,474 | 3/1964 | Zweibel et al. .................... | 244/77 A |
| 3,157,877 | 11/1964 | Tatz et al. .......................... | 244/77 A |
| 3,169,730 | 2/1965 | Gaylor et al. ...................... | 244/77 A |
| 3,398,267 | 8/1968 | Hattendorf..................... | 235/150.26 |

Primary Examiner—Verlin R. Pendegrass
Attorney—Anthony F. Cuoco and Plante, Arens, Hartz and O'Brien

[57] ABSTRACT

A system for guiding vertical flight of an aircraft to a predetermined aimpoint and including means for displaying for pilot information the angle between the line of sight of the craft to the predetermined aimpoint and the horizontal, the ground distance from the aircraft to the predetermined aimpoint, the ground speed of the aircraft, the time to reach the aimpoint and the angle between the aircraft velocity vector and the horizontal. The craft is guided during vertical maneuvers in response to a signal corresponding to the angle between the line of sight of the aircraft to the predetermined aimpoint and the horizontal, a signal corresponding to the angle between the aircraft velocity vector and the line of sight of the aircraft to the predetermined aimpoint, and a signal corresponding to the angle between the aircraft velocity vector and the horizontal.

13 Claims, 2 Drawing Figures

VERTICAL FLIGHT PATH COMPUTER

BACKGROUND OF THE INVENTION

1. Field of the Invention

This invention relates to aircraft guidance systems and, more particularly, to systems for guiding the vertical flight of an aircraft.

2. Description of the Prior Art

While flight control systems have been for many years tied into horizontal navigation systems (VOR, TACAN) no similar tie-in to vertical navigational systems has been effectively accomplished. The principal reason for this has been the unavailability of accurate on-board sensing equipment to provide data for making the required calculations. Prior to the present invention, vertical flight maneuvers were performed manually. Once the pilot left his present altitude, the altitude of the craft was an integral function of vertical speed. Since most vertical speed systems are relatively inaccurate, large errors occurred after several minutes of integration. In order to avoid these errors, the pilot had to redetermine his original maneuver many times during the flight. Modern high speed aircraft have the necessary on-board equipment to provide data with the required accuracy whereby the device of the present invention may be effectively used for displaying flight information and for guiding the craft.

SUMMARY OF THE INVENTION

This invention contemplates apparatus for guiding vertical flight of an aircraft to a predetermined aimpoint. An instrument servo arrangement is responsive to a signal corresponding to the slant range of the craft from a ground based DME (Distance Measuring Equipment) transmitting a signal corresponding to the slant range of the craft from a predetermined aimpoint, a signal corresponding to aircraft altitude and a signal corresponding to aimpoint altitude for deriving the instantaneous angle between the line of sight of the aircraft to the aimpoint and the horizontal, and for deriving a signal corresponding to the ground distance from the aimpoint to the craft. Another servo arrangement is responsive to the ground distance signal for providing a ground speed signal, and yet another servo arrangement is responsive to the ground speed signal and the ground distance signal for providing a signal corresponding to the time to the aimpoint. Still another servo arrangement is responsive to a signal corresponding to aircraft true airspeed and a signal corresponding to aircraft altitude rate for deriving the angle between the velocity vector of the aircraft and the horizontal. The derived parameters are displayed for pilot information and a pitch command signal to an autopilot or flight director is provided in response to the signals corresponding to the angle between the aircraft velocity vector and the horizontal, the angle between the line of sight of the aircraft to the aimpoint and the horizontal and the angle between the line of sight to the predetermined aimpoint and the velocity vector.

One object of this invention is to provide apparatus for making relatively simple computations involving easily measured parameters for deriving position, velocity and flying time of an aircraft relative to a preselected aimpoint.

Another object of this invention is to provide means responsive to slant range as measured by conventional distance measuring equipment (DME) and responsive to altitude as measured by conventional barometric equipment for deriving the instantaneous angle between the horizontal and the line of sight of the craft to a predetermined aimpoint as well as the ground distance to the aimpoint.

Another object of this invention is to provide on-board equipment for presenting information to a pilot, and which information is required while making a vertical flight maneuver.

Another object of this invention is to provide means responsive to signals corresponding to the rate of descent and the true airspeed of an aircraft for deriving the angle between the velocity vector of the craft and the horizontal.

Another object of this invention is to provide means responsive to signals corresponding to the ground distance of the aircraft from a predetermined aimpoint and the ground speed of the aircraft for deriving the flight time to said aimpoint.

Another object of this invention is to provide a pitch command signal for guiding the vertical flight of an aircraft in response to signals corresponding to the angle between the horizontal and the line of sight of the craft to a predetermined aimpoint, the angle between the horizontal and the velocity vector of the craft and the angle between the velocity vector and the line of sight to the predetermined aimpoint.

The foregoing and other objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

Figure 1:
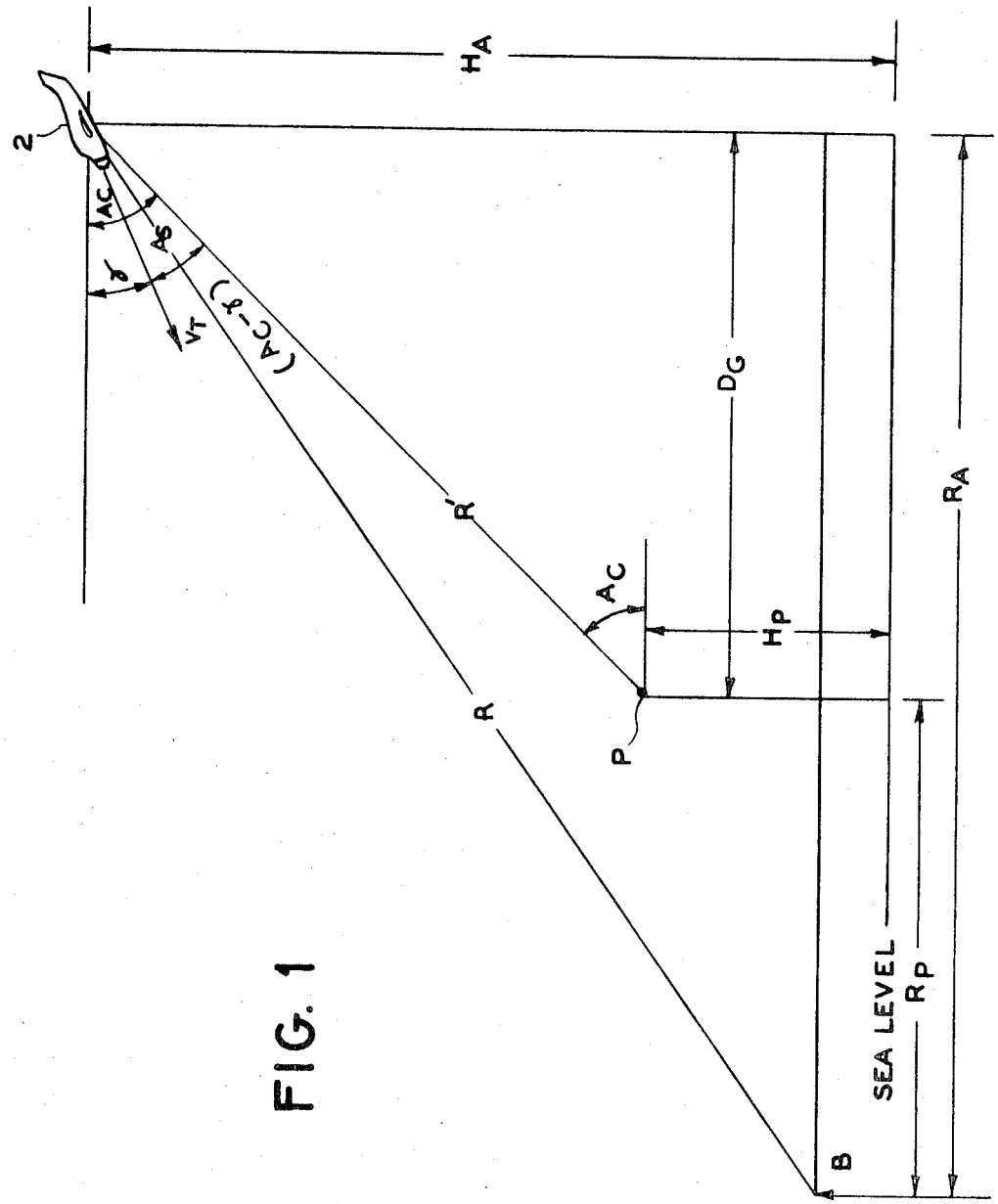
FIG. 1 is a diagrammatic representation of a flight path profile showing the parameters of the present invention.

DESCRIPTION OF THE INVENTION with reference to FIG. 1, an aircraft 2 is flying a path $\gamma$ degrees from the horizontal at a true airspeed $V_T$ and at a corrected barometric altitude $H_A$. It is desired to fly the craft to an aimpoint P and which aimpoint P is at a corrected barometric altitude $H_P$ and at a ground distance $D_G$ from aircraft 2. The slant range of the craft from a ground based DME (Distance Measuring Equipment) station B is designated as $R$. Aimpoint P is at a ground distance $R_P$ from DME station B and at a ground distance $R_A$ from aircraft 2.

The line of sight from aircraft 2 to aimpoint P is designated as slant range vector $R'$. Slant range vector $R'$ is at an angle $A_C$ from the horizontal and may be trigonometrically expressed as follows:

$$A_C = \operatorname{Tan}^{-1}(H_A - H_P)/(R_A - R_P) \quad (1)$$

For angles below 15°, and within which limit vertical flight maneuvers are commonly made, $R_A$ approximates $R$ and Tan $A_C$ approximates Sin $A_C$. Angle $A_C$ may thus be expressed as follows:

$$A_C = \sin^{-1}(H_A - H_P)/(R - R_P) \tag{2}$$

Since altitude $H_A$ and slant range $R$ are continuously obtained from an air data computer and from DME station B, respectively, ground distance $D_G$ of aircraft 2 from aimpoint P may be expressed as follows:

$$D_G = (R - R_P) \cos A_C \tag{3}$$

Ground speed $V_G$ of aircraft 2 is determined by differentiating ground distance $D_G$ with respect to time. The flying time $T$ to aimpoint $P$ is determined by dividing ground distance $D_G$ by ground speed $V_G$ and may be expressed as follows:

$$T = D_G/V_G \tag{4}$$

The flight path angle $\gamma$ of aircraft 2 is expressed as follows:

$$\gamma = \tan^{-1}(H/V_T) \tag{5}$$

Where $H$ is the barometric rate of descent of aircraft 2 and $V_T$ is true airspeed as heretofore noted.

If it is desired to track a path making an angle of $A_s$ degrees down to aimpoint $P$, and which angle $A_s$ is the angle between the aircraft velocity vector and the line of sight from aircraft 2 to aimpoint $P$ (R'), a pitch command signal can be provided by combining angles $\gamma$, $A_C$ and $A_s$. Thus, angular track displacement is $(A_C - A_s)$ and a signal proportional to the rate of change of track error is $(\gamma - A_s)$. A pitch command signal $\theta_c$ may thus be expressed as follows:

$$\theta_c = K_D(A_C - A_s) + K_R(\gamma - A_s) \tag{6}$$

Where $K_D$ and $K_R$ are predetermined gain factors. Comparison of $\theta_c$ with an actual attitude signal from a gyro provides an aircraft control signal which can be applied to a flight director or autopilot system. If the gyro signal is washed out, long term tracking errors due to aircraft trim changes are minimized.

Figure 2:
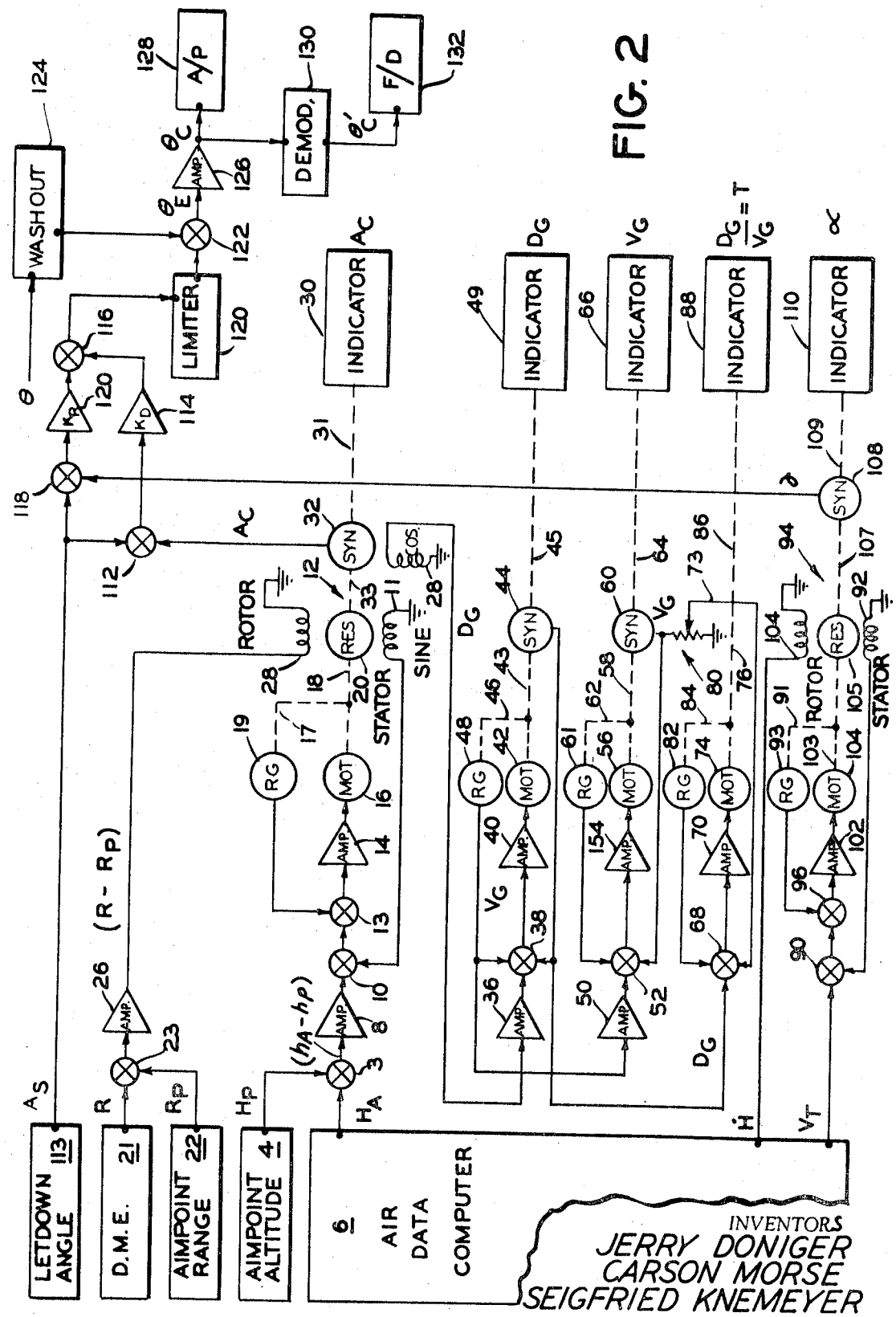
FIG. 2 is a block diagram showing a system for controlling the vertical flight of an aircraft according to the invention.

Referring, then to FIG. 2, the instantaneous angle $A_C$ between slant range vector R' and the horizontal is computed knowing slant range $R$, slant range vector R', aimpoint altitude $H_P$ and aircraft altitude $H_A$. A signal corresponding to a pilot selected aimpoint elevation $H_P$ is provided by a device such as a potentiometer 4 located in the control panel of aircraft 2 and which signal $H_P$ is summed by a summing means 3 with an aircraft altitude signal $H_A$ provided by an on-board air data computer 6. The summation signal is amplified by an amplifier 8 and applied to a summing means 10 and summed thereby with a signal from a stator (sine) winding 11 of a resolver 12.

The signal from summing means 10 is applied through a summing means 13 to a servo amplifier 14 for driving a servomotor 16, and which motor 16 is connected by suitable mechanical means 18 to a rotor 20 of resolver 12. A signal corresponding to pilot selected aimpoint ground distance $R_P$ is provided by a potentiometer 22 located in the control panel of aircraft 2 and which signal $R_P$ is summed by a summing means 23 with a signal corresponding to slant range R provided by an on-board DME receiver 21.

The summation signal from summing means 23 is amplified by an amplifier 26 and applied to resolver 12 for exciting rotor winding 29 thereof. Motor 16 drives resolver rotor 20 until the voltage induced in stator winding 11 of resolver 12 counteracts the signal from amplifier 8 with the signal from summing means 10 being thereupon zero. At this time motor 16 stops and the output shaft position thereof corresponds to angle $A_C$. Since aircraft 2 is in motion, angle $A_C$ continuously changes and is displayed on an indicator 30 which is connected by suitable mechanical means 31 to a synchro 32 and which synchro 32 is connected by suitable mechanical means 33 to resolver rotor 20 so as to be driven thereby. Synchro 32 provides a signal corresponding to angle $A_C$ according to the relationship shown in equation (1).

Servomotor 16 is connected by suitable mechanical means 17 to a rate generator 19. The output from rate generator 19 is applied to summation means 13 and summed with the signal from summation means 10 to stabilize servo response.

A stator (cosine) winding 28 of resolver 12 is in space quadrature with stator (sine) winding 11 and provides, in accordance with equation (3), a signal proportional to ground distance $D_G$ of aircraft 2 from aimpoint $P$. Signal $D_G$ is applied to an amplifier 36 and therefrom through a summation means 38 to a servo amplifier 40. The signal from servo amplifier 40 drives a servomotor 42. Servomotor 42 is connected by suitable mechanical means 43 to a synchro 44 which, in turn, is connected through suitable mechanical means 45 to an indicator 49 for driving indicator 49, and which indicator displays ground speed $D_G$. Synchro 44 provides a signal corresponding to ground distance $D_G$.

A rate generator 48 is connected by suitable mechanical means 46 to servomotor 42 so as to be driven thereby, and the output from rate generator 48 corresponding to ground speed $V_G$, is applied to summation means 38 and summed thereat with the signal from amplifier 36 and with a position feedback signal from synchro 44 for stabilizing servo response.

Ground speed signal $V_G$ from rate generator 48 is applied to an amplifier 50 and therefrom through a summing means 52 to a servo amplifier 54. Servo amplifier 54 drives a servomotor 56, and which servomotor 56 is connected by suitable mechanical means 58 to a synchro 60. Synchro 60 is connected by suitable mechanical means 64 to an indicator 66 for driving indicator 66, and which indicator displays ground speed $V_G$. Synchro 60 provides a signal corresponding to ground speed $V_G$.

The rate generator 61 is connected by suitable mechanical means 62 to servomotor 56 so as to be driven thereby and the output of rate generator 61 is applied to summation means 52 and summed thereat with the signal from amplifier 50 and with a position feedback signal from synchro 60 to stabilize servo response.

Ground distance signal $D_G$ from synchro 44 is applied to a summation means 68 and summed thereat with a signal from a follow-up potentiometer 80 connected to synchro 60. Potentiometer 80 has an adjustable arm 73 connected by suitable mechanical means 76 to a servomotor 74, and which servomotor 74 is driven by the output of summation means 68 applied through a servo amplifier 70. Potentiometer 80 is excited by ground speed signal $V_G$ from synchro 60 and, therefore, with high gain provided by servo amplifier 70, the output shaft position of servomotor 74 corresponds to the ratio $D_G/V_G$ or equivalently, to the time $T$ to aimpoint $P$ as indicated in equation (4).

A rate generator 82 is connected by suitable mechanical means 84 to servomotor 74. The output of rate generator 82 is applied to summation means 68 and summed thereat with distance signal $D_G$ and the follow-up signal from potentiometer 80 to stabilize servo response. Servomotor 74 is connected by suitable mechanical means 76 and 86 to an indicator 88 for driving indicator 88, and which indicator displays the time $T$ to aimpoint $P$.

Air data computer 6 provides a signal corresponding to true airspeed $V_T$ of aircraft 2, and which signal $V_T$ is applied to a summation means 90 and summed thereat with a signal from a stator winding (sine) 92 of a resolver 94. Resolver 94 has a rotor winding 104 excited by a signal $\dot{H}$ corresponding to the rate of descent of aircraft 2 provided by computer 6. The signal from summing means 90 is applied through a summing means 96 to a servo amplifier 102 for driving a servomotor 104. Thus, the position of the output shaft of motor 102 is the ratio $\dot{H}/V_T$ or, equivalently, angle $\gamma$ as indicated by equation (5).

Servomotor 104 is connected by suitable mechanical means 103 to a rotor 105 of resolver 94 and rotor 105, in turn, is connected by suitable mechanical means 107 to a synchro 108. Synchro 108 provides a signal corresponding to angle $\gamma$ and is connected by suitable mechanical means 109 to an indicator 110 for driving indicator 110, and which indicator displays angle $\gamma$.

A rate generator 93 is connected by suitable mechanical means 91 to motor 104. The output of rate generator 93 is applied to summation means 96 and summed thereat with the signal from summing means 90 to stabilize servo response.

Signal $A_C$ from synchro 32 is applied to a summing means 112 and summed thereat with a signal corresponding to a pilot selected angle $A_s$ provided by a potentiometer 113. As heretofore noted angle $A_s$ corresponds to the angle between velocity vector $V_T$ and slant range vector $R'$ and may otherwise be defined as the desired let down angle for aircraft 2 to reach aimpoint $P$. The signal from summing means 112 is applied to an amplifier 114 having a gain $K_D$.

Signal $\gamma$ from synchro 108 is applied to a summing means 118 and summed thereat with signal $A_s$. The signal from summing means 118 is applied to an amplifier 120 having a gain $K_R$.

The signals from amplifiers 114 and 120 are applied to a summing means 116 and the summation signal therefrom is applied to a limiter 120. The signal from limiter 120 is applied to a summation means 122 and summed thereat with a pitch attitude signal $\theta$ provided by, for example, a gyro (not shown), and which signal $\theta$ is applied through a wash out circuit 124 having a predetermined transfer constant for compensating for long term tracking errors. The signal from summation means 122, and which signal is a pitch error signal $\theta_E$, is applied to an amplifier 126 for providing a pitch control signal $\theta_c$. Pitch control signal $\theta_c$ is applied to an automatic pilot 128 for controlling aircraft 2. Alternatively, the signal from amplifier 126 is applied to a demodulator 130 for providing a pitch control signal $\theta_c'$, and which control signal $\theta_c'$ is applied to a flight director 132 for controlling aircraft 2.

OPERATION

Referring to FIGS. 1 and 2, the instantaneous angle $A_C$ between range vector $R'$ and the horizontal is computed from slant range signal $R$, slant range signal $R'$, aimpoint altitude signal $H_P$ and aircraft altitude signal $H_A$. The computation is accomplished by a resolver instrument servo arrangement including servo amplifier 14, servomotor 16 and resolver 12. Thus, the signal provided by summing aimpoint elevation signal $H_P$ and aircraft altitude signal $H_A$ is summed with a signal from stator winding 11 of resolver 12, and which summation signal drives servomotor 16 which in turn drives resolver rotor 20.

A rotor winding 29 of resolver 12 is excited with a signal corresponding to the summation of slant range signal $R$ from DME receiver 21 and slant range signal $R'$ from potentiometer 22. Motor 16 drives resolver rotor 20 until the voltage induced in stator winding 11 causes the signal from summation means 10 to be zero, and at which time motor 16 stops and its output shaft position corresponds to angle $A_C$ between range vector $R'$ and the horizontal. Since the aircraft is in motion, angle $A_C$ continuously changes and indicator 30 displays the instantaneous angle $A_C$.

In accordance with the trigonometrical relationship between stator winding 11 and stator winding 28 of resolver 12 (sine and cosine respectively) stator winding 28 provides a signal corresponding to ground distance $D_G$ of aircraft 2 from aimpoint $P$. Signal $D_G$ drives a second instrument servo arrangement including servo amplifier 40 and servomotor 42, and which servomotor 42 drives an indicator 49 for displaying ground distance $D_G$. Rate generator 48 is connected to servomotor 42 so as to be driven thereby and provides a signal corresponding to ground speed $V_G$ of aircraft 2.

Ground speed signal $D_G$ is applied to a third instrument servo arrangement including servo amplifier 54 and servomotor 56, and which servomotor 56 drives indicator 66 for indicating ground speed $D_G$ of aircraft 2.

A fourth instrument servo arrangement includes servo amplifier 70 and servomotor 74, and which servomotor 74 is driven by a signal corresponding to the difference between ground distance signal $D_G$ and the signal from follow-up potentiometer 80. Potentiometer 80 is excited by ground speed signal $V_G$ so that the output shaft position of servomotor 74 corresponds to the ratio of ground distance $D_G$ to ground speed $V_G$ or, equivalently, to the time $T$ to aimpoint $P$.

A final resolver instrument servo arrangement includes servo amplifier 102, servomotor 104 and resolver 94, and which servomotor 104 is driven by a signal corresponding to the difference between the true airspeed $V_T$ of aircraft 2 and the signal from stator winding 92 of resolver 94. Resolver rotor winding 104 is excited by altitude rate signal $\dot{H}$ so that the shaft position of motor 104 is proportional to the ratio of $\dot{H}$ to $V_T$ and thus corresponds to a linear function of angle $\gamma$ between the aircraft velocity vector and slant range vector $R'$.

Pitch altitude control signals $\theta_c$ and $\theta_c'$ are derived as shown in the block diagram of FIG. 2. Signal $A_C$ is summed with signal $A_s$ at summing means 112, with the summation signal therefrom corresponding to aircraft track displacement $(A_C - A_s)$. Signal $A_s$ is summed with signal $\gamma$ from synchro 108 at summing means 118, with the summation signal therefrom being a track error rate damping signal $(\gamma - A_C)$. The signals from summing means 112 and 118 are summed at summing means 116 and the summation signal is limited and combined with pitch attitude signal $\theta$ for providing pitch control signal $\theta_c$ for autopilot 128. Pitch control signal $\theta_c$ is demodulated for providing pitch control signal $\theta_c'$ for flight director 132.

What is claimed is:

1. A system for controlling the vertical flight of an aircraft, comprising:
    first means for providing a signal corresponding to the angle between the line of sight from the aircraft to a predetermined aimpoint and the horizontal;
    second means for providing a signal corresponding to the angle between the aircraft velocity vector and the horizontal;
    third means for providing a signal corresponding to the angle between the aircraft velocity vector and the line of sight from the aircraft to the predetermined aimpoint;
    first summing means connected to the first and third means for summing the signals therefrom;
    second summing means connected to the second and third means for summing the signals therefrom;
    means connected to the first and second summing means and responsive to the summation signals therefrom for providing a control signal; and
    means connected to the control signal means and responsive to the control signal therefrom for controlling the craft.

2. A system as described by claim 1, wherein the means for providing a signal corresponding to the angle between the line of sight from the aircraft to a predetermined aimpoint and the horizontal, comprises:
    means for providing a signal corresponding to the slant range of the aircraft from a ground based signal transmitting station;
    means for providing a signal corresponding to the slant range of the aircraft from the predetermined aimpoint;
    third summing means connected to said last two mentioned means for summing the signals therefrom;
    means for providing a signal corresponding to aircraft altitude;
    means for providing a signal corresponding to predetermined aimpoint altitude; and
    means connected to the third summing means, the aircraft altitude signal means and the aimpoint altitude signal means and responsive to the signals therefrom for providing the signal corresponding to the angle between the line of sight from the aircraft to the predetermined aimpoint and the horizontal.

3. A system as described by claim 1, wherein the second means for providing a signal corresponding to the angle between the aircraft velocity vector and the horizontal, comprises:
    means for providing a signal corresponding to altitude rate of the aircraft;
    means for providing a signal corresponding to true airspeed of the aircraft; and
    means connected to said last two mentioned means and responsive to the signals therefrom for providing the signal corresponding to the angle between the aircraft velocity vector and the horizontal.

4. A system as described by claim 2, including:
    fourth summing means connected to the aircraft altitude signal means and to the aimpoint altitude signal means for summing the signals therefrom; and
    means connected to the third and fourth summation means and responsive to the signals therefrom for providing a signal corresponding to the ground distance of the aircraft from the predetermined aimpoint.

5. A system as described by claim 4, including:
    a resolver connected to the third summing means for being excited by the summation signal therefrom and for providing first and second output signals;
    fifth summing means connected to the fourth summing means and connected to the resolver for summing the summation signal from said fourth summing means and the first resolver output signal;
    servo means including a motor connected to the fifth summing means for being driven by the summation signal therefrom;
    the resolver being coupled to the motor for being driven thereby until the first output signal from the resolver is zero whereupon the position of the motor shaft corresponds to the angle between the line of sight from the aircraft to the predetermined aimpoint and the horizontal; and
    a first synchro connected to the resolver and driven thereby for providing a signal corresponding to said angle.

6. A system as described by claim 5, including:
    indicating means connected to the synchro and driven thereby so as to provide an indication of the instantaneous value of said angle.

7. A system as described by claim 5, including:
    a second synchro for providing an output signal;
    sixth summing means connected to said second synchro and connected to the resolver for summing the second resolver output signal and the second synchro output signal;
    servo means including a motor connected to the sixth means so as to be driven by the signal therefrom;
    the second synchro being coupled to the motor for being driven thereby so that the second synchro output signal corresponds to ground distance from the predetermined aimpoint to the aircraft; and
    indicating means coupled to the second synchro and driven thereby so as to provide an indication of said ground distance.

8. A system as described by claim 7, including:
    a rate generator connected to the motor and driven thereby so as to provide a signal as a differential function of the motor shaft position, and which signal corresponds to the ground speed of the aircraft.

9. A system as described by claim 8, including seventh summing means and:
    a third synchro for providing an output signal;
    other servo means including a motor connected to the seventh summing means so as to be driven by the signal therefrom;
    another rate generator connected to said motor and driven thereby for providing a signal as a differential function of said motor shaft position;

the seventh summing means connected to said third synchro, the one rate generator and the other rate generator for summing the signals therefrom and for providing a summation signal;

the third synchro being coupled to the motor for being driven thereby so that the synchro output signal corresponds to ground speed; and indicating means coupled to the third synchro and driven thereby so as to provide an indication of said ground speed.

10. A system as described by claim 9, including eighth summing means and:

a potentiometer connected to the third synchro and excited by the ground speed signal therefrom for providing an output signal;

yet other servo means including a motor connected to the eighth summing means so as to be driven by the signal therefrom;

yet another rate generator connected to said motor and driven thereby for providing a signal as a differential function of the motor shaft position;

the eighth summing means connected to the second synchro, the potentiometer, and said last mentioned rate generator for summing the signals therefrom and for providing a summation signal;

the potentiometer being connected to said motor and driven thereby so that the position of the movable element of said potentiometer corresponds to the time to said predetermined aimpoint; and an indicator connected to the movable arm of said potentiometer so as to be driven thereby for providing an indication of said time.

11. A system as described by claim 3, wherein the means responsive to said signals for providing the signal corresponding to the angle between the aircraft velocity vector and the horizontal includes:

resolver means connected to the altitude rate signal means and excited by the signal therefrom for providing an output signal;

combining means connected to the true air speed signal means and connected to the resolver means for summing the true airspeed signal and the output signal therefrom for providing a summation signal;

a motor connected to the summing means for being driven by the summation signal therefrom;

the resolver means being coupled to the motor for being driven thereby until the output signal from the resolver is zero whereupon the position of the motor shaft corresponds to the angle between the aircraft velocity vector and the horizontal; and means connected to the resolver and driven thereby for providing a signal corresponding to said angle.

12. A system as described by claim 11, including:

indicating means connected to the synchro and driven thereby so as to provide an indication of the instantaneous value of said angle.

13. A system as described by claim 1, wherein the means connected to the control signal means and responsive to the control signal therefrom for controlling the craft includes:

a limiter connected to the control signal means for limiting the control signal;

means for providing a pitch attitude signal;

means connected to the pitch attitude signal means for washing out the signal therefrom to compensate for long term errors;

means connected to the limiter and to the washout means for summing the signals therefrom; and means responsive to the summation signal for controlling the craft.

* * * * *